(12) United States Patent
Hoess et al.

(10) Patent No.: US 6,613,871 B2
(45) Date of Patent: Sep. 2, 2003

(54) METHOD FOR REDUCING THE POLYMER CONTENT OF EFFLUENT DURING THE DRAINAGE OF POLYMER/WATER MIXTURES

(75) Inventors: Werner Hoess, Heusenstamm (DE); Hartmut Schikowsky, Darmstadt (DE); Krzysztof Sado, Mainz (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/089,082

(22) PCT Filed: Jul. 26, 2001

(86) PCT No.: PCT/EP01/08629
§ 371 (c)(1),
(2), (4) Date: Apr. 10, 2002

(87) PCT Pub. No.: WO02/18453
PCT Pub. Date: Mar. 7, 2002

(65) Prior Publication Data
US 2002/0188098 A1 Dec. 12, 2002

(30) Foreign Application Priority Data
Aug. 28, 2000 (DE) .......................................... 100 42 120

(51) Int. Cl.$^7$ ................................................. C08F 6/00

(52) U.S. Cl. ................. 528/499; 264/176.1; 264/328.1; 264/349; 525/63; 525/64; 528/480; 528/502

(58) Field of Search ........................... 264/176.1, 328.1, 264/349; 528/499, 502, 480; 525/64, 63

(56) References Cited

U.S. PATENT DOCUMENTS

| | | | |
|---|---|---|---|
| 4,148,991 A | | 4/1979 | Skidmore |
| 4,299,952 A | | 11/1981 | Pingel et al. |
| 4,539,396 A | | 9/1985 | Yasui et al. |
| 5,650,107 A | * | 7/1997 | Vetter et al. ................. 264/102 |

FOREIGN PATENT DOCUMENTS

| | | |
|---|---|---|
| DE | 197 18 597 | 1/1999 |
| JP | 01 230605 | 9/1989 |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

The invention relates to a method for reducing the polymer content in the wastewater from dewatering of two-phase liquid mixtures comprising a thermoplastic plastic melt and an aqueous phase by coagulating the plastic melt and pressing the water out of the melt cake in an extruder system, characterized in that superheated steam with a temperature of at least 280° C. is injected immediately after introduction of the two-phase liquid mixture into the extruder system.

18 Claims, No Drawings

METHOD FOR REDUCING THE POLYMER CONTENT OF EFFLUENT DURING THE DRAINAGE OF POLYMER/WATER MIXTURES

PRIOR ART

German Patent 3842796 C2 describes clear impact-resistant molding compounds comprising A) 10 to 90 wt % of a hard phase, formed from 80 to 100 wt % (relative to A) of methyl methacrylate and 20 to 0 wt % of a lower alkyl acrylate, B) 90 to 10 wt % of a elastomeric phase, distributed in the hard phase, with a glass transition temperature below −10° C., an average particle size of the elastomeric phase smaller than 130 nm and an inhomogeneity of the elastomeric-phase particle size of less than 0.5, formed from at least 50 wt % (relative to B) of a lower alkyl acrylate and 0.5 to 5 wt % of a graft cross-linking agent or of a cross-linking monomer with three or more ethylenically unsaturated groups capable of radical polymerization and, if necessary, with further ethylenically unsaturated aliphatic comonomers capable of radical (co)polymerization, and C) not more than 0.05 wt % of water-soluble constituents, wherein at least 15 wt % of the hard phase is covalently bonded to the tough phase. Processing of the emulsion polymer to the molding compound takes place in the extruder, especially in a twin-screw vented extruder, wherein the water phase is separated in liquid form. Details about the polymer concentration in the wastewater are not provided.

European Patent A 0683028 describes a method for dewatering a two-phase liquid mixture comprising a thermoplastic plastic melt and an aqueous phase in a counter-rotating twin-screw extruder. Therein coagulation of the plastic latex can take place directly in the extruder under the shear action in the coagulation zone at a temperature in the thermoplastic range of the plastic. The melt is then conveyed in partly filled screw channels, and compressed to a cohesive melt cake in at least one of these screw channels while developing a steep, local narrowly limited pressure gradient. In this way the water drained off from the boundary of the melt cake flows downward under the influence of gravity in such a way that the melt cake is not in contact with a coherent water phase. When this method is used, the water content of an emulsion polymer having a starting water content of 55 wt % can be reduced, for example, to only 8 wt %. The residual quantities of volatile constituents can then be largely separated in a vented extruder by means of a forward-and-backward vent zone. The granules discharged at the granulating nozzle ultimately have a residual moisture content of only 0.06 wt %. In the case of three-phase emulsion polymers, residual polymer concentrations in the range of 0.4 wt % are found as organic substance in the pressed-out water.

German Patent 19718597 C1 describes a method for dewatering a two-phase liquid mixture comprising a thermoplastic plastic phase and an aqueous phase by coagulating the two-phase liquid mixture in a first extruder, dewatering the coagulated substance in a twin-screw extruder with counter-rotating screws with a vent zone, and separating volatile constituents by devolatilization, wherein a single-screw extruder or a twin-screw extruder is used as the first extruder, this twin-screw extruder being equipped with screws rotating in the same direction. In the case of three-phase emulsion polymers, residual polymer concentrations in the range of 0.35 wt % are obtained in the pressed-out water.

OBJECT AND ACHIEVEMENT

Dewatering of two-phase liquid mixtures comprising a thermoplastic plastic melt and an aqueous phase by coagulating the plastic melt and squeezing the water out of the melt cake in an extruder system suffers from the problem that the wastewater often has an undesirably high polymer concentration. This problem occurs especially in emulsion polymers with small particle size, since they usually can be coagulated only poorly. In emulsion polymers with relatively large particle diameters, which otherwise can be coagulated and during standard operation exhibit only low polymer concentrations in the wastewater, the problem also exists if the throughput is increased. In this case the coagulation efficiency generally deteriorates, with the result that the polymer concentration in the wastewater increases once again. This constitutes a particular disadvantage, since the separated aqueous phase thus contains the polymer as an impurity and cannot be used further. The polymer content in the wastewater leads to high loads (COD values) on the clarifying plant during wastewater treatment. Furthermore the polymer loss reduces the yields of the thermoplastic plastic melt. It was therefore necessary to find a method that leads to a reduction of the polymer concentration in the wastewater.

The object is achieved by a method for reduction of the polymer content in the wastewater from dewatering of two-phase liquid mixtures comprising a thermoplastic plastic melt and an aqueous phase by coagulating the plastic melt and squeezing out the water from the melt cake in an extruder system, characterized in that superheated steam with a temperature of at least 280° C. is injected immediately after introduction of the two-phase liquid mixture into the extruder system.

OPERATION OF THE INVENTION

The method of the invention is suitable for reduction of the polymer concentration in the wastewater from dewatering of two-phase liquid mixtures comprising a thermoplastic plastic melt and an aqueous phase by coagulating the plastic melt and pressing the water out of the melt cake in an extruder system.

The method is suitable in particular for emulsion polymers with an average particle size of 50 to 130 nm (weight-average value), for example as are described generally in German Patent 3842796 C2 as well as specifically in the examples. The inhomogeneity of the particle size, can, for example, be less than 0.2. The emulsion polymers in this case comprise latex particles with a thermoplastic hard phase and a cross-linked elastomeric phase, which can be used as two-shell impact modifiers.

The method is also suitable for emulsion polymers that can otherwise be readily coagulated and that have average particle sizes of larger than 130 nm up to 500 nm, especially from 250 to 400 nm, when the systems are operated at higher throughput and as a result the polymer concentrations in the wastewater increase undesirably once again. Worth mentioning in particular here are emulsion polymers for impact modifiers of three-shell structure for polymethyl methacrylate, as described generally in European Patent A 0683028 and German Patent 19718597 C1 and specifically in the examples. If the polymer throughput in the methods described in European Patent A 0683028 and German Patent 19718597 C1 is increased, for example doubled, the heat input and in turn the coagulation efficiency usually deteriorates. Thereby the initially very low polymer concentrations in the wastewater increase to levels higher than 1 wt % or even higher than 2 wt %. In combination with the present invention, the values even at high throughputs can be lowered once again to levels below 1 wt %, especially below 0.5 wt %.

The method is therefore suitable in particular for latices. These usually contain 30 to 50 wt % of dispersed plastic particles, whose average particle size can be, for example, 100 to 500 nm. Accordingly the aqueous phase corresponds to 70 to 50 wt %; it generally contains dissolved emulsifiers, and possibly coagulating agents or other auxiliary and foreign substances.

The latex particles comprise thermoplastic plastics that can be processed in an extruder in molten condition. These comprise thermoplastic plastics with glass transition temperatures of 50 to 300° C. or a temperature range in the molten condition in which they are sufficiently resistant to decomposition. The melt temperature in the twin-screw extruder usually lies between 100 and 250° C.

Important classes of thermoplastic plastics are copolymers based on butadiene, styrene and possibly acrylonitrile, as well as polyvinyl chloride, polyacrylates or polymethacrylates. A further important class includes latices of multi-phase thermoplastic plastics containing latex particles with a thermoplastic hard phase and a cross-linked tough phase. During the process they can be mixed if necessary with a further thermoplastic plastic, which is introduced in solid or molten form into the twin-screw extruder and which is identical to or compatible with the plastic of the hard phase of the latex.

Preferably the plastic of the hard phase consists mainly of polymethyl methacrylate and the plastic of the tough phase consists mainly of cross-linked polybutyl acrylate, which can also be copolymerized if necessary with styrene or benzyl acrylate for the purpose of matching the optical refractive index to that of the polymethyl methacrylate. Typical mixtures of this type contain, for example, 4 to 50 wt % of the multi-phase latex plastic, wherein the polybutyl acrylate content can amount to 2 to 80 wt % and the polymethyl methacrylate content 20 to 98 wt %, plus 2 to 60 wt % of the thermoplastic polymethyl methacrylate plastic. If this is not introduced in molten form, it is also possible to mix the latex of the multi-phase plastic with a polymethyl methacrylate latex and to process the latex mixture by the method of the invention.

An extruder system for dewatering of emulsion polymers generally contains a coagulation zone, in which the latex is coagulated and where phase separation is initiated by shear-inducing elements such as kneading, mixing and dynamic pressure zones at an operating pressure above the water vapor pressure. A dewatering zone from which the water is removed in liquid form is also provided. Hereby, especially water-soluble constituents such as emulsifiers or electrolytes, are also separated.

A vent zone separated from the dewatering zone by a pressure-tight compression zone is provided for separation of further water. Finally a pump zone for renewed pressure buildup and for discharge of the melt is provided. The functions can be distributed over a plurality of machine units or extruders.

The extruder system can comprise a twin-screw extruder with counter-rotating screws, in which the plastic melt is coagulated and the water is pressed out of the melt cake. Such a system and the corresponding method are described in, for example, European Patent A 0683028.

The extruder system can also comprise a single-screw extruder or a twin-screw extruder with co-rotating screws, in which coagulation takes place, and a downstream twin-screw extruder with counter-rotating screws, in which coagulation and pressing-out take place. Such a system and the corresponding method are described in German Patent 19718597 C1.

In the inventive method, superheated steam with a temperature of at least 280° C., preferably 290 to 300° C., especially preferably 300 to 320° C., is injected immediately after introduction of the two-phase liquid mixture comprising the thermoplastic plastic melt and the aqueous phase into the extruder system. Such injection into the extruder takes place at appropriate pressure of 25 to 35 bar, especially 28 to 32 bar. The injected steam flow can be, for example, 1 to 10, preferably 2 to 8, especially preferably 4 to 6 kg of water per hour, in each case relative to a throughput of 10 to 20 kg of plastic/water mixture to be dewatered.

Injection is accomplished by means of suitable equipment, such as a feedwater pump for steam with a mass flowmeter and an electrically heated and insulated steam generator. A laboratory system, for example, can be designed to use a steam generator with a heating power of 10 to 15 kW. As an example, the vapor pressure of superheated steam with a temperature of 310° C. can then be in the range of 50 bar at the outlet of the steam generator and in the range of about 30 bar at the inlet of the extruder.

From the twin-screw extruder, the dewatered plastic is discharged in the form of a melt. This can be performed by means of a pelletizing die, from which a plurality of thin strands is extruded, cooled to below the softening temperature and chopped to commercial-grade pellets of molding compound. Using a suitable extrusion die, however, it is also possible to extrude a molded plastic profile such as a sheet directly, in a manner known in itself.

EXAMPLES

Example 1 (comparison example)

An emulsion polymer formed in two stages (impact modifier for PMMA molding compounds) with the following composition is processed: (In parentheses mass ratios of the monomer constituents indicated by abbreviations)

| | |
|---|---|
| Stage I: | Butyl acrylate/allyl methacrylate in 98:2 ratio |
| Stage II: | Methyl methacrylate/butyl acrylate/3-(2-benzotriazolyl)-2-hydroxy-5-tertoctylbenzyl methacrylamide in 89.1:8.0:2.9 ratio |

Mass ratio of I/II=33.4/66.6

Mass ratio of polymer phase/aqueous phase=40/60

Average particle size: about 60 nm

The latex is pumped by a diaphragm metering pump at a mass flow of 15 kg/h into the cylinder (zone 1) of a tightly intermeshing, counter-rotating twin-screw extruder. The screw diameters are 34 mm. The screws have three flights with a pitch of 30 mm. The screw speed is 115 rpm.

The coagulation zone has a length of 600 mm and is divided into five zones (zones 1 to 5), beginning with zone 1.

The specified temperatures of the coagulation zones in the extruder are: zone 1: 260° C./zone 2: 270° C./zone 3: 250° C./zone 4: 240° C./zone 5: 170° C.

Zone 5 is followed by a dewatering zone, which is equipped with a hold-up screw and has a length of 120 mm.

In the dewatering zone the two cylinders have outlets in the form of slots 2 mm wide and 60 mm long at the lowest point. The collection tank is mounted pressure-tightly under these two openings.

Via the line, the collection tank for the separated water is maintained under a nitrogen pressure of 40 bar. By means of a liquid-level controller, a water flow of 5.27 kg/h is drawn off via the valve. The feed flow to the downstream vented extruder is regulated by a valve such that the melt pressure upstream from the valve is kept constant at 80 bar. The feed flow to the vented extruder contains 8 wt % of water.

In the vented extruder (screw diameter 30 mm) the residual quantities of volatile constituents are separated by two vent zones. The pressure in the first vent zone is 100 mbar and in the downstream vent zone is 10 mbar. The extruded or granulated material discharged at a granulating nozzle has a residual moisture content of 0.06 wt %.

The water collected in the dewatering zone has a polymer concentration of 2 wt %.

Example 2 (according to the invention)

The same procedure as in Example 1 was used except that superheated steam was injected immediately after introduction of the emulsion polymer formed in two stages into the extruder system.

Between zone 1 and zone 2 a line is connected for injection of superheated steam, which is generated via a feedwater pump for steam with mass flowmeter and an electrically heated and insulated steam generator. The heating plate in the steam generator is designed for 12 kW. There the water is transformed quantitatively to superheated steam with a temperature of 310° C. The steam pressure developed during operation is about 50 bar at the outlet of the steam generator; a pressure of about 30 bar (depending on steam flow and cylinder temperature) is established at the inlet to the extruder. A water-rinse loop is installed for rinsing of the tubular line and of the injection valve.

When superheated steam is injected at 5 kg/h into 15 kg of latex/water mixture, the temperature of the cylinder wall rises from 150 to 190° C. in zone 1 and from about 220° C. to 260° C. in zone 2. The cooling-water flow metered in upstream from the dewatering zone in zone 5 was increased from 9 kg/h to 13 kg/h. Otherwise the melt temperature would have been too high and thus the melt viscosity too low, which could have allowed the melt to drain off through the water channels and thus cause serious plugging.

The water collected in the dewatering zone has a polymer concentration of 0.3 wt %.

What is claimed is:

1. A method comprising
    separating a two phase liquid mixture of a thermoplastic melt and an aqueous phase by coagulating the thermoplastic melt to form a melt cake and pressing water out of the melt cake in an extruder system,
    wherein superheated steam having a temperature of at least 280° C. is injected immediately after the two-phase liquid mixture is introduced into the extruder system, to reduce the thermoplastic content in the water.

2. The method according to claim 1, wherein the extruder system comprises a twin-screw extruder having counter-rotating screws, in which coagulation and pressing-out take place.

3. The method according to claim 1, wherein the extruder system comprises a single-screw extruder or a twin-screw extruder with co-rotating screws, in which coagulation takes place, and a twin-screw extruder with counter-rotating screws, in which coagulation and pressing-out take place.

4. The method according to claim 1, wherein the thermoplastic melt comprises an emulsion polymer having an average particle size of 50 to 130 mm.

5. The method according to claim 4, wherein the emulsion polymer comprises latex particles having a thermoplastic hard phase and a cross-linked tough phase.

6. The method according to claim 5, wherein the hard phase comprises mainly polymethyl methacrylate and the latex particles of the tough phase comprise cross-linked polybutyl acrylate, optionally copolymerized with styrene or benzyl methacrylate.

7. The method according to claim 1, wherein the thermoplastic melt comprises an emulsion polymer with an average particle size of larger than 130 up to 500 nm.

8. The method according to claim 7, wherein the emulsion polymer is an impact modifier, formed in three shells, for polymethyl methacrylate.

9. The method of claim 1, wherein the thermoplastic melt has a melting temperature of from 100 to 250° C.

10. The method of claim 1, wherein the thermoplastic melt comprises a thermoplastic copolymer comprising one or more monomers selected from the group consisting of butadiene, styrene, acrylonitrile, vinyl chloride, an acrylate and a methacrylate.

11. The method of claim 1, wherein the water has a polymer concentration of less than 1 wt. % after the water is pressed out of the melt cake.

12. The method of claim 1, wherein the water has a polymer concentration of less than 0.5 wt. % after the water is pressed out of the melt cake.

13. The method of claim 1, wherein the extruder system has a vent zone.

14. The method of claim 1, wherein the superheated steam has a temperature of from 290 to 300° C.

15. The method of claim 1, wherein the superheated steam has a temperature of from 300 to 320° C.

16. The method of claim 1, wherein the superheated steam is injected at a pressure of from 25 to 30 bar.

17. The method of claim 1, further comprising:
    discharging the dewatered thermoplastic in the form of a melt.

18. The method of claim 17, wherein the dewatered thermoplastic is discharged through a granulating nozzle.

* * * * *